(12) United States Patent
El-Damhougy

(10) Patent No.: US 7,848,262 B2
(45) Date of Patent: Dec. 7, 2010

(54) NEURAL NETWORK-BASED MOBILITY MANAGEMENT FOR HEALING MOBILE AD HOC RADIO NETWORKS

(75) Inventor: Hesham El-Damhougy, Tustin, CA (US)

(73) Assignee: The Boeing Company, Chicago, IL (US)

( * ) Notice: Subject to any disclaimer, the term of this patent is extended or adjusted under 35 U.S.C. 154(b) by 1199 days.

(21) Appl. No.: 11/426,428

(22) Filed: Jun. 26, 2006

(65) Prior Publication Data

US 2007/0299947 A1 Dec. 27, 2007

(51) Int. Cl.
*H04L 12/28* (2006.01)
(52) U.S. Cl. ...................... 370/255; 709/249
(58) Field of Classification Search .............. 370/310; 701/59; 706/15
See application file for complete search history.

(56) References Cited

U.S. PATENT DOCUMENTS

| 6,317,658 | B1 * | 11/2001 | Vian ............................. 701/1 |
| 2005/0114551 | A1 * | 5/2005 | Basu et al. .................. 709/249 |
| 2007/0214046 | A1 * | 9/2007 | Falchuk et al. ................ 705/14 |

* cited by examiner

*Primary Examiner*—Rafael Pérez-Gutiérrez
*Assistant Examiner*—Marcos Batista
(74) *Attorney, Agent, or Firm*—Law Office of Charles W. Peterson, Jr.

(57) ABSTRACT

A self healing ad hoc communications network and method of training for and healing the network. The network includes wireless devices or nodes that include a neural network element and the ad hoc network operates as a neural network. Some of the nodes are designated as healing nodes that are identified during network training and are strategically located in the network coverage area. Whenever one group of nodes loses connection with another a healing node may reposition itself to reconnect the two groups. Thus, the network can maintain connectivity without constraining node movement.

25 Claims, 11 Drawing Sheets

| | |
|---|---|
| 192 | INITIALIZATION: H = n = EMPTY SET |
| 194 | INPUT A NEW DATA VECTOR x∈X REPRESENTING POTENTIAL RADIO NODE POSITION; |
| 196 | FIND $W_c$ THAT $d(x,W_c) = MIN_i\{d(x,W_c)\}$. $W_c$ IS CALLED WINNER NODE (NEURON) |
| 198 | TEST FOR $d(x,W_c) < \rho$ (MINIMUM ACCEPTABLE PROPAGATION LOSS) IF THE WINNER NODE FAILS THEN |
| 200 | A NEW NODE (NEURON) FROM D CLOSEST TO x IS MOVED TO THE POSITION OF X OR Y:= CENTROID { ζ, ζ∈X} DENOTE THE NEW NEURON POSITION BY $W_g$. |
| 202/204 | IF D ≠ n THEN H ← H ∪ {$W_g$}; D ← D\{$W_g$} |
| 208 | IF THE WINNER NODE PASSES 198 AND IF PARTITION FOUND THEN {UPDATE THE WINNER NODE AND ITS NEIGHBORS POSITIONS, AND CONNECTIONS ACCORDING TO |
| 212 | • $W_i \leftarrow W_i + \Delta W_i$<br>• WHERE $\Delta W_i = \eta\, h(i,i^*)\,(x - W_i)$ WHERE $i^*$ IS THE INDEX OF THE WINNER NODE AND h IS A NEIGHBORHOOD FUNCTION |
| 210 | ELSE STOP "NETWORK HEALED" |
| 206 | GO BACK TO STEP 194 UNTIL "NO MORE POSITIONS x AVAILABLE"; |
| 214/216 | TEST FOR PARTITIONS: IF NO PARTITION IS FOUND THEN: [ PRUNE H BY REMOVING HEALING NODES ONE AT A TIME WHERE AT EACH STEP APPLY PARTITION DETECTION ALGORITHM. STOP WHEN PARTITION DISCOVERED] |
| 218 | ELSE "IF MORE POSITIONS x AVAILABLE * GO TO STEP 194 ELSE STOP "NETWORK FAILS TO HEAL" |

FIG. 4B

| | |
|---|---|
| 192 | INITIALIZATION: H = n .. EMPTY SET |
| 294 | INPUT A NEW DATA VECTOR x∈X REPRESENTING RADIO NODE POSITIONS ON THE BATTLE THEATER; |
| 196 | FIND $W_c$ SUCH THAT $d(x,W_c) = MIN_i(d(x,W_i))$ : CALLED WINNER NODE (NEURON) |
| 198 | TEST FOR $d(x,W_c) < \rho$ (MINIMUM ACCEPTABLE PROPAGATION LOSS)<br>IF THE WINNER NODE FAILS |
| 300 | A NEW NODE (NEURON) IS CREATED, ITS POSITION IS X OR Y:= CENTROID{ ζ, ζ∈X}. DENOTE THE NEW NEURON POSITION BY $W_g$. |
| 204 | H ← H ∪ {$W_g$} |
| 208 | IF THE WINNER NODE PASSES 198 AND IF PARTITION FOUND THEN {UPDATE THE WINNER AND ITS NEIGHBORS POSITIONS, THEIR AGES AND CONNECTIONS ACCORDING TO |
| 312 | • $W_i ← W_i + \Delta W_i$<br>• WHERE $\Delta W_i = \eta\, h(i,i^*)\,(x - W_i)$ WHERE $i^*$ IS THE INDEX OF THE WINNER NODE |
| 313 | • UPDATE THE AGES} FOR VORONOI POWER TESSELLATION DELAUNAY POWER TRIANGULATION |
| 210 | ELSE STOP "NETWORK HEALED" |
| 206 | GO BACK TO STEP 294 UNTIL "NO MORE POSITIONS x OR NETWORK HEALED", |
| 214/218 | PRUNING: TEST FOR PARTITIONS: IF NO PARTITION IS FOUND THEN: [ PRUNE H BY REMOVING HEALING NODES ONE AT A TIME WHERE AT EACH STEP APPLY PARTITION DETECTION ALGORITHM. STOP WHEN PARTITION DISCOVERED} |
| 316 | ELSE "IF MORE POSITIONS x AVAILABLE GO TO STEP 294. IN CASE NO MORE POSITIONS AVAILABLE, THE SET X CAN BE FINE GRAINED AND AUGMENTED/ENLARGED SO THAT STEP 294 GETS EXECUTED MORE TO ARRIVE AT FULLY CONNECTED NETWORK |

FIG. 7B

NEURAL NETWORK-BASED MOBILITY MANAGEMENT FOR HEALING MOBILE AD HOC RADIO NETWORKS

CROSS REFERENCE TO RELATED APPLICATION

The present invention is related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. patent application Ser. No. 11/426,417, "NEURAL NETWORK-BASED MOBILITY MANAGEMENT FOR MOBILE AD HOC RADIO NETWORKS," U.S. Pat. No. 7,555,468, "NEURAL NETWORK-BASED NODE MOBILITY AND NETWORK CONNECTIVITY PREDECTIONS FOR MOBILE AD HOC RADIO NETWORK," and U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS," to Hesham El-Damhougy, filed coincident herewith, all four assigned to the assignee of the present invention and incorporated herein by reference.

BACKGROUND OF THE INVENTION

1. Field of the Invention

The present invention generally relates to an adaptable mobile communications networks and, more particularly, to an ad-hoc mobile network for adaptable wireless communications in an unstructured environment such as a tactical battlefield.

2. Background Description

Tactical radio communications rely heavily on mobile radio networks and systems that are continually changing while in use. Emerging tactical battlefield networks typically include a collection of mobile autonomous host nodes or terminals that support numerous mobile clients. Unlike a typical commercial mobile telephone network, for example, these mobile nodes are not connected together by fixed land based connections (e.g., hard wired), but continually move into and out of radio communication range with each other. Consequently, one generally cannot rely on a pre-defined fixed infrastructure within this type of environment. Moreover, the nodes may be destroyed, or new nodes may join the network. Thus, such a mobile, wireless network may be considered dynamically changing and so, infrastructure-less or "ad-hoc" in that the nodes and node locations dynamically change over time. As a result, the connectivity among the nodes may vary with time.

Since a typical wireless ad-hoc network lacks fixed communications nodes (e.g., base stations) to define the network, a group of autonomous nodes or terminals serve to define the network. The autonomous nodes form a decentralized multi-hop radio network and communicate with each other to maintain connectivity. Each node may represent radio communication devices that may be located with a person (such as a war-fighter), located on/in a ground or an air vehicles platform, e.g., an Unmanned Air Vehicle (UAV), and an Unmanned Ground Vehicles (UGV). As is typical with any network, such a wireless ad-hoc network can be represented graphically by a set of time varying vertices representing network nodes with edges between nodes that are capable of communicating with each other. So, at any particular time, for example, the network nodes may be represented as a set of points that indicate the node locations at that instant. A graph edge or line between two vertices indicates that the two nodes are connected, i.e., the corresponding nodes can reach each other (or communicate) by a radio link. So, each line represents a radio link between two communicating nodes. Two radio nodes are said to be communicating if the link quality is above a predefined threshold, e.g., where the signal-to-noise ratio (SNR) is above a predefined threshold. Nodes are communicating indirectly or through an indirect path in a path that passes through at least one intermediate node.

Normally, each mobile node in a wireless ad-hoc network can communicate at least with one or more neighboring mobile nodes that are a single radio hop away. Since, typically, the wireless ad-hoc network is operating in the absence of fixed radio relay base stations; each mobile node operates not only as a host but also as a router to relay communications from other connected nodes. Thus, the nodes are typically forwarding/relaying information packets between other mobile nodes in the wireless ad-hoc network that may not be within direct wireless transmission range of each other. So, network control is distributed among the nodes and each node participates in an ad-hoc routing protocol that allows it to discover "multi-hop" paths through the network to any other node.

Further, since the nodes are mobile, and because of node departures and additions, the network topology may change rapidly and unpredictably over time. Nodes can fail, for example, if they are destroyed or due to hard or soft failures which occur in the battlefield. Typical radio communication effects, such as noise, fading, and interference, can impede communications and prevent some nodes from connecting to others. Consequently, for reliable communications the wireless ad-hoc network must be able to compensate for variable link quality. Wireless propagation path loss, fading, multiuser interference, distance between nodes and signal strength variations can all affect connection quality. In addition, operating area/network topology losses can further interfere with communications. Changes in propagation conditions and the environment, such as inclement weather, and irregular terrain (e.g., interrupted by mountains and buildings), for example, can interfere with network communications. Thus, changes in propagation conditions and the environment, as well as the unpredictability of node movements and sporadic node failures, can contribute to the dynamic nature of an ad-hoc network. Further, when links between nodes break, the network can be split into isolated sub-networks. Such a break in the network can create a situation where some nodes cannot communicate with others, i.e., there are absolutely no direct or indirect paths between these nodes. In this case, the network is said to be "partitioned." These problems are even further complicated in a military environment where the preservation of security, latency, reliability, intentional jamming, and recovery from failure are significant concerns.

The Department of Defense (DoD) has instituted an initiative known as the Joint Tactical Radio System (JTRS) to provide a flexible new approach to meeting diverse warfighter communications needs through software-programmable tactical radio technology or "software defined radios (SDRs)." In particular, these SDRs are intended for voice, data and video communications across a battle-space. However, beyond the battlefield, the JTRS may have application for initiatives in areas as diverse as homeland security, Federal, state and local law enforcement, search and rescue, commercial aviation and international commercial applications. The JTRS implements the concept of relay and translation nodes (land, sea, air and space based) to help ensure that tactical users can access required information wherever it resides. To accomplish this, however, nodes must be able to communicate with each other in spite of links being broken frequently as nodes move, randomly fail, or are destroyed e.g., in enemy or unintentional attacks.

Accordingly, there is a need for an ad-hoc mobile network that can adapt well to link changes, and in particular to inter-connectivity changes between ad-hoc mobile network nodes. Further, there is a need to maintain network-wide connectivity in ad-hoc networks, i.e., maintaining communication paths, either node-to-node or by multiple-node-hopping and routing, that allows any two nodes to maintain communication with one another.

SUMMARY OF THE INVENTION

An embodiment of the present invention includes a self healing ad hoc communications network and method of training for and healing the network. The network includes wireless devices or nodes that include a neural network element and the ad hoc network operates as a self-organized neural network, where neurons represent special nodes that are dynamically added, repositioned or removed as needed. These nodes are designated as healing nodes that are identified during network training and are strategically located in the network coverage area. Whenever one group of nodes loses connection with another group, one or more healing nodes may be called (added) or recalled to reposition themselves to reconnect the two or more disconnected groups. Thus, the network can maintain connectivity without constraining network node movements.

Advantageously, a preferred ad hoc communications network is self-managing and self-healing to adapt well to operating changes, and in particular to interconnectivity changes between preferred nodes. After initially identifying hierarchically organized network leaders, cluster nodes reorganize themselves and change cluster leaders as the situation requires. Further, a preferred ad hoc communications network optimizes node connectivity and positions healing nodes to maintain network-wide connectivity in spite of node and connection changes. New healing nodes can be easily inserted or added (such as unmanned air or ground vehicles) to maintain network wide connectivity, and the loss of a node does not always require reconfiguring the network to maintain communication.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A-B show an example of selecting healing nodes for healing the network.

FIGS. 7A-B show a flow diagram example 280 and corresponding pseudo code example of adaptive self organizing 264 and power classification 268 in healing a network as shown in FIG. 6.

DETAILED DESCRIPTION OF THE INVENTION

Figure 1A:
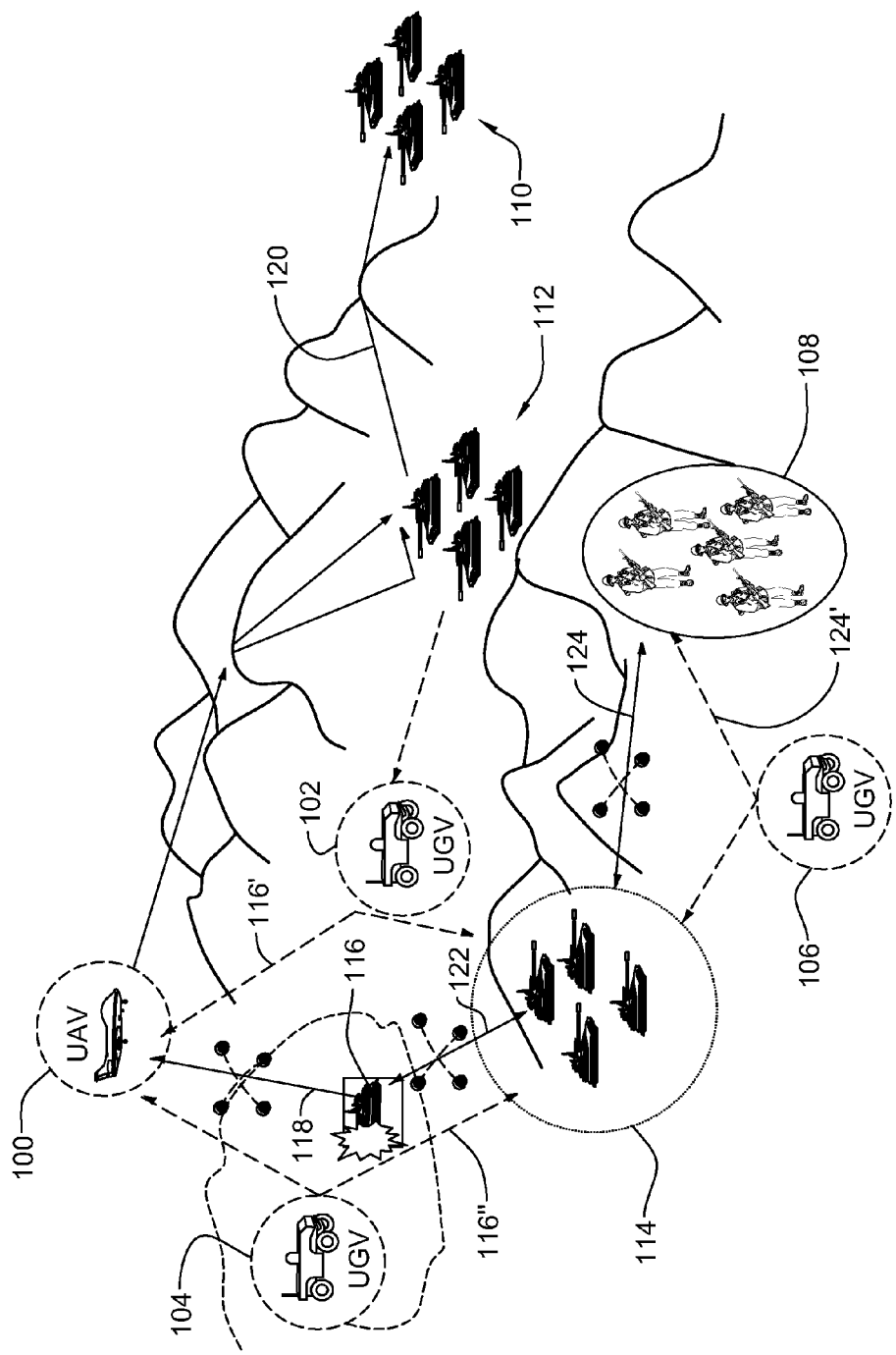
FIGS. 1A-C show a battlefield example of an ad hoc hierarchical mobile communications network and graphical representations of the battlefield example according to an advantageous embodiment of the present invention.
Figure 1B:
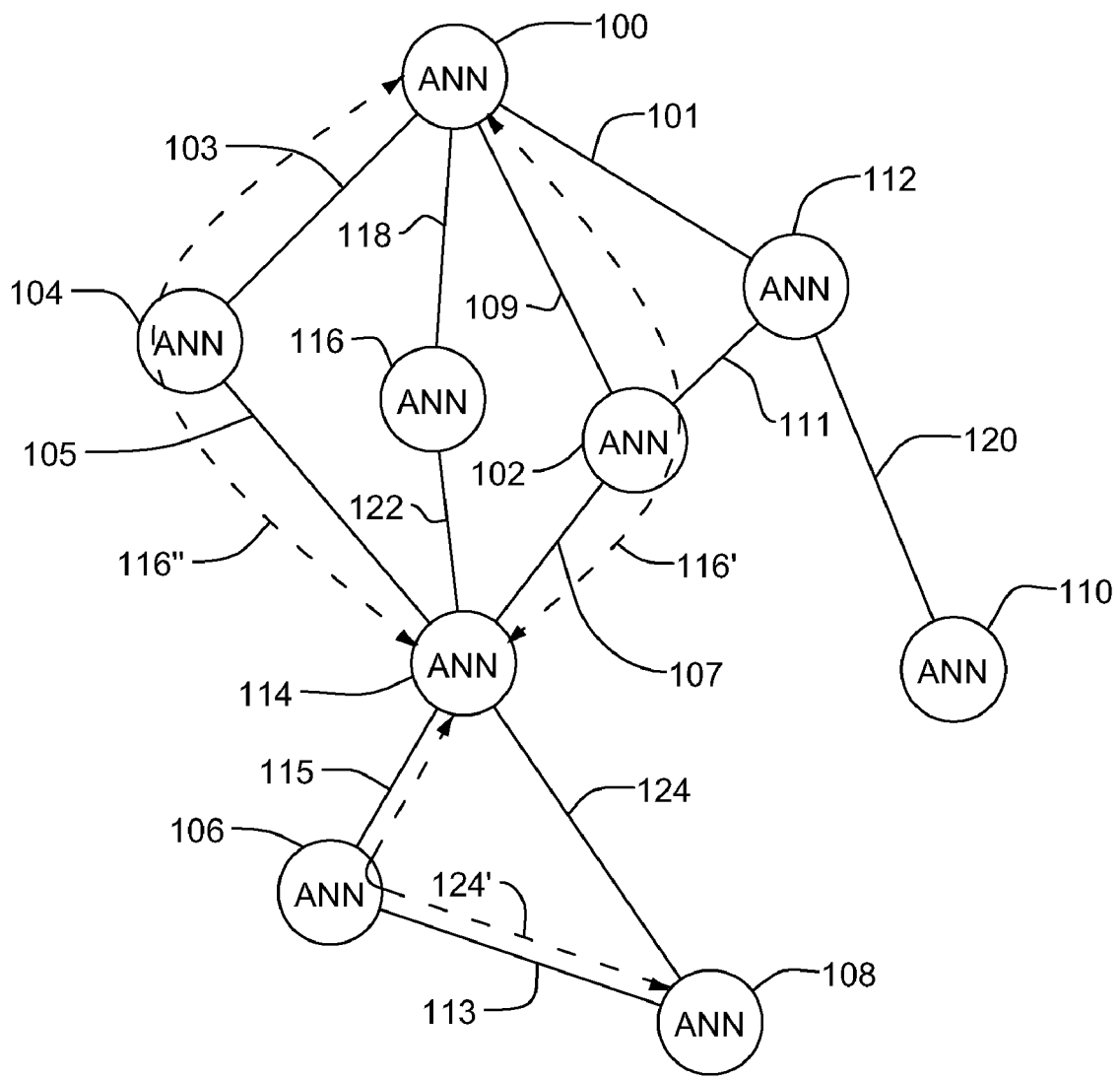
Figure 1C:
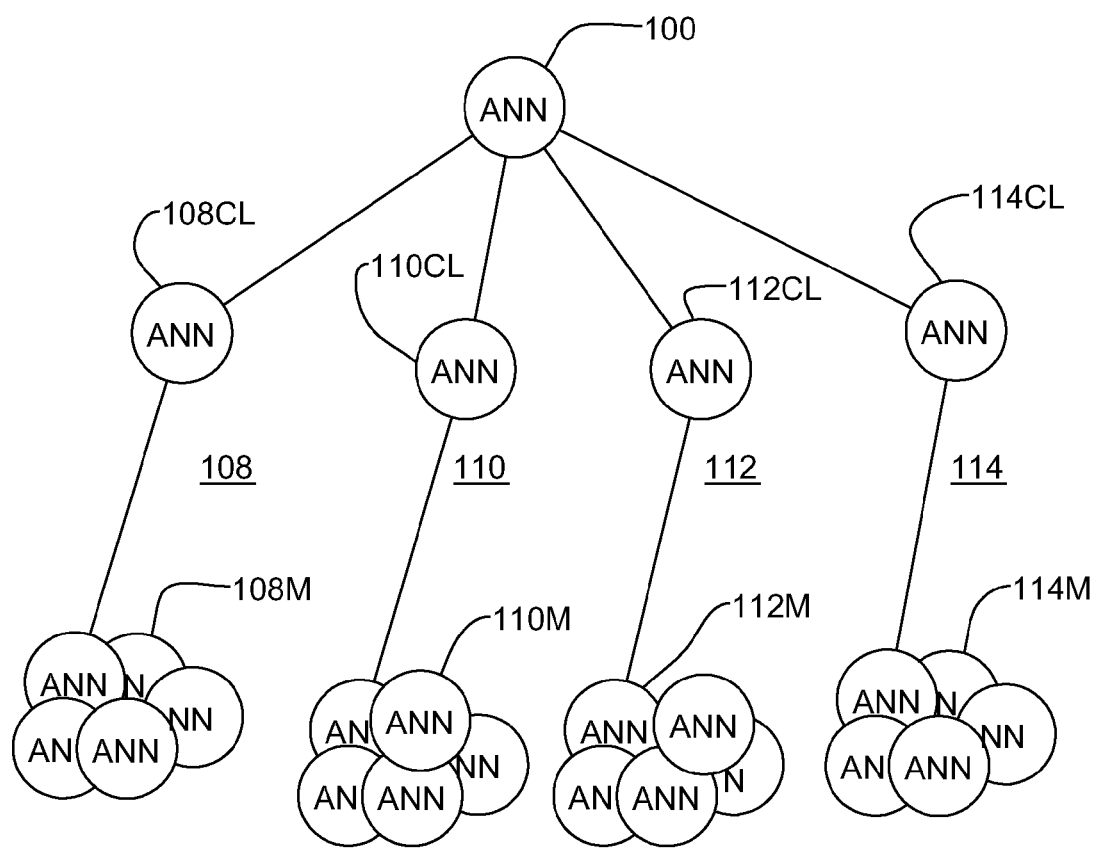

Turning now to the drawings and more particularly, FIGS. 1A-C show a battlefield example of a self monitoring ad hoc mobile communications network and graphical representation of the battlefield example according to an advantageous embodiment of the present invention. The preferred self monitoring ad hoc mobile radio network is an Artificial Neural Network (ANN) based communications network. More particularly, a preferred ad hoc mobile radio network is an Adaptive Self Organizing Neural Network (ASONN) of self monitoring artificial neurons or, an ANN element based communications devices, stations or nodes and is referred to herein as a Mobile Communications Neural Network (MCNN). Each node monitors other directly connected nodes to identify and predict disconnections and, expected re-connections. As shown in this example, a MCNN may include both airborne and ground based communications units or stations as nodes and, preferably is hierarchically organized. Although described herein with reference to a battlefield application, this is for example only and not intended as a limitation. The present invention has application to quickly providing self-sustaining and self-organized communications where no fixed land mobile network may be available or has been destroyed, e.g., in an emergency situation or during a severe natural disaster.

The MCNN airborne nodes may include both unmanned air vehicles (UAVs) 100 and manned air vehicles, e.g., attack helicopters (not shown). Ground nodes may include unmanned ground vehicles (UGVs) 102, 104, 106, and ground forces including, for example, infantry units 108 and manned ground vehicles, e.g., tank units 110, 112, 114 and individual tanks 116. Some of these nodes are healing neurons, e.g., UGVs 102, 104, 106, with dynamic time dependent positions. Typically, the healing neurons may be used or recalled for healing the network when/if it is partitioned or communications are cut off between two or more groups of nodes. Others of the remaining nodes may be used for training or for providing input to the neural network to adapt or readjust the healing nodes (neurons) positions to keep entire network connected. Also, each mobile node may employ an ANN element that functions as an approximator for approximating the link life to all neighboring nodes. The ANN elements may be trained either off-line or on-line. Examples of suitable ANN elements are discussed by S. Haykin in "Neural Networks: A Comprehensive Foundation," Macmillan Publishing, New York (1994). The ANN element can be organized, for example, as Multilayer Perceptrons (MLP), or a Radial basis function neural network. Multilayer Perceptrons are widely used for pattern classification in a feed-forward network, are trained with a standard back-propagation algorithm and, are supervised in training for a desired response.

Further, a preferred MCNN is scalable. So, preferably, to facilitate managing large networks, the MCNN is organized in sub-networks of nodes or groups of nodes. A node is also known as a vertex. A plurality of nodes may be called vertices. Groups of nodes, also called clusters, may be treated as a single node when the cluster has full connectivity or a cluster leader or in the alternative as a cluster. The size, S(C), of a cluster C is the cardinal number C. Each cluster performs substantially as a MCNN within the bounds of the cluster. So, for example, if the infantry unit 108 includes a single MCNN device, the infantry unit 108 is a node. Alternately, each individual soldier in each infantry unit 108 may carry a personal MCNN unit (not shown) for individual communications and, therefore, is a node. Typically, each tank in each tank unit 110, 112, 114, includes a MCNN unit and, therefore, is a node and each tank unit 110, 112, 114 is a cluster. For convenience of discussion, in the graphical representation of FIG. 1B, the infantry unit 108 and tank unit 110, 112, 114 are taken as clusters and represented as a single node in the graph.

Each cluster and each node within a cluster has a known position and velocity and is capable of communicating directly with any other node within the cluster that is within range and not otherwise blocked. In the network graph of FIG. 1B, links between directly connected nodes/clusters 102, 104, 106, 108, 110, 112, 114 and 116 are represented by edges 101, 103, 105, 107, 109, 111, 113, 115, 118, 120, 122 and 124. Edges may also be called links. Two nodes that can communicate directly with each other are directly linked and can exchange information directly with one another. So, for example, the UAV 100 is directly connected, initially, to UVGs 102, 104, tank unit 112, and through link 118 to tank 116. Direct Communication may be blocked between two nodes, for example, by terrain, structures, atmospheric conditions, battlefield conditions (e.g., countermeasures) or otherwise. So, two nodes that cannot directly communicate (i.e., are not linked) can connect over a path through other directly linked nodes and so, are indirectly linked through one or more intervening nodes. For example, tank unit 110 is networked through link 120 to tank unit 112 and so, indirectly connected or linked to other nodes. Tank unit 114 is indirectly connected to the UAV 100, for example, through link 122 to tank 116 and through link 118 from tank 116. Infantry unit 108 connects to the network indirectly through link 124 to tank unit 114. An indirect path between tank unit 114 and UAV 100 may be via 116' or 116" through UVG 102 or UVG 104, respectively. The MCNN diameter is the graph diameter determined by the "longest shortest path" between any two nodes. So, in the present example, the MCNN diameter is the path between the infantry unit 108 and tank unit 110.

Typically, a number of nodes (healing neurons) are strategically placed around the coverage area as healing nodes to reliably maintain MCNN network connectivity. These nodes facilitate network healing in the event of a loss of connectivity and the ensuing partition if the MCNN. Preferably, these healing nodes are freely reconfigurable nodes that may be unclustered, i.e., not included in any cluster, and each is located to be transported over a relatively short distance within the coverage area, as necessary, to heal (i.e., reconnect from) local network disconnects. So for example, a linking node may be lost to partition the network, separating one or more nodes/clusters from the rest. Preferably, a local healing node is located nearby to reconnect the partitions. So, the network may be healed by moving the healing node into a suitable location to reconnect both partitions, by moving the separated nodes to connect to the healing node or by rearranging/reorganizing the entire network. In this example, the UGVs 102, 104, 106 are healing nodes. The UAV 100 may also be a healing node if circumstances warrant it. Network healing can be categorized as self-healing or as operator assisted healing, both of which are described hereinbelow.

Each cluster organized around what may be called a Cluster leader (CL) or a clusterhead. Typically, an operator selects initial cluster leaders as described in U.S. patent application Ser. No. 11/426,417, "NEURAL NETWORK-BASED MOBILITY MANAGEMENT FOR MOBILE AD HOC RADIO NETWORKS," to Hesham El-Damhougy (hereinafter El-Damhougy I), filed coincident herewith, assigned to the assignee of the present invention and incorporated herein by reference. After cluster leader selection, the cluster leaders may each hand off to other cluster nodes whenever the cluster leader determines that such a hand off may be necessary or desired. The size of each cluster is the number of nodes in the cluster. The degree of any node is the number of edges connected to the node, i.e., the number of directly linked nodes. A subset of nodes that are mutually reachable by a path of a given maximum length, k, is referred to as a k-cluster. A clique is a k-cluster with k=1. The infantry unit 108 and the tank units 110, 112 may each include several nodes and so, although represented graphically in FIGS. 1A and 1B as nodes, may each represent a clique or a k-cluster as shown in FIG. 1C.

FIG. 1C shows an example of hierarchical organization of a preferred MCNN with cluster leaders hierarchically organized with several sublevels within the MCNN and within each cluster. The nodes of FIG. 1A including the UAV 100, UGVs 102, 104, 106, the infantry unit 108 and the tank units 110, 112, 114 and tank 116 may each be designated/treated as a cluster. One node is identified as the manager over the entire MCNN and is designated as the Network Management System (NMS), the UAV 100 in this example. A single node is selected as cluster leader 108CL, 110CL, 112CL and 114CL from respective cluster members 108M, 110M, 112M and 114M in each of the infantry unit 108 and the tank units 110, 112, and 114. Each cluster leader 108CL, 110CL, 112CL and 114CL acts as a sub-network (cluster) manager. Optionally, secondary and tertiary or lower order cluster leaders (not shown) may be selected from members 108M, 110M, 112M and 114M in each respective cluster. Each cluster leader 108CL, 110CL, 112CL and 114CL is responsible for intercluster communication and cluster leaders 108CL, 110CL, 112CL and 114CL exchange information (e.g., node connectivity and strength, network status, and cluster leader assignment/reassignment information) with each other and with the NMS the UAV 100, e.g., MCNN status. Since each node may include an ANN element, each ANN node may be assigned/assume responsibility as a cluster leader, dynamically, as the cluster changes. Also, typically, each cluster leader may be assigned/assume responsibility as the NMS for the entire MCNN, dynamically, as the network configuration changes. The NMS may act as a local cluster leader or, as an independent node, unassigned to a cluster or assigned to a cluster of one.

Prior to deployment, simulation results collected for training the nodes, preferably, from theater simulation as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005, assigned to the assignee of the present invention and incorporated herein by reference. Preferably, training is also done using artificial neurons, which may or may not be identical to the neurons 130 in the network or neurons located in healing nodes. After training, an operator, for example, identifies cluster leaders and one node as the NMS. The nodes receive theater information and training results from the simulation that may include, for example, a coarse terrain map, a mission mobility profile, and coarse propagation models. The coarse propagation models may include suitable well-known telecommunications models, such as for example, an Epstein-Peterson model for physical analysis and mixed mode models, such as ITU Radiocommunication Sector (ITU-R) and Longley-Rice/Longley-Rice Adaptive models. Thereafter, the NMS and cluster leaders continually monitor MCNN status and predict network changes based on node mobility for real time network planning and healing.

Typically, because of node mobility, at any given time some clusters may not be able to communicate directly and/or indirectly with others. So, to track individual connections to each other, the nodes form and maintain a connectivity matrix. The connectivity matrix indicates the position of every node in the cluster and represents all node connections for each node with rows and columns corresponding to specific nodes and ones and zeros indicating the presence (1) or absence (0) of a direct link to another node. Preferably, each cluster leader monitors link quality in the cluster and maintains tables and matrices, including connectivity matrices (for k nodes in the cluster, the cluster leader maintains connectivity matrices $C_1, C_2, \ldots, C_k$) and a link life matrix for local nodes within the cluster. Link life is the length of time a particular pair of connected nodes are expected to stay connected. The NMS maintains a connectivity matrix for the entire MCNN. During normal operation where nodes may be constantly in motion, periodically, each node sends connectivity table updates to its cluster leader. Preferably, for computational efficiency, a node initiates an update to the cluster leader only when table entries change in the node and each node sends only the changed entries.

The cluster leader or another designated node in each cluster determines link life for each pair of nodes within the cluster. So, typically, the cluster leaders maintain an estimation (link life) matrix that may be used for predicting connectivity and adjusting and healing the network as necessary. The link life matrix quantitatively indicates a value for the expected life of each link between any two nodes in the cluster. Nodes at rest (not moving) may be represented as having an arbitrarily high link life value, e.g., a defined maximum. Periodically, the cluster leader distributes updates, both to local nodes and to the NMS, and exchanges link life information with the NMS. Preferably, for computational efficiency the cluster leaders initiate updates only when link life matrix/table entries change for the respective cluster and each cluster leader sends only changed entries. The NMS can use the updates to arrive at an overall network or global connectivity matrix. Alternately, the global connectivity matrix can be maintained at one or more of the cluster leaders instead or in addition to the NMS.

Cluster leaders can also take some local actions with respect to the cluster. For example, cluster leaders can partition the cluster, if necessary, and heal the cluster partitions after partition changing events, e.g., loss of a node or loss of communications with a node linking partitions. The MCNN may be voluntarily partitioned to maintain/manage communication across partition boundaries and within the partitions. If necessary, individual clusters may be partitioned into smaller clusters, e.g., the infantry unit 108 of FIG. 1 can split into smaller groups. Also, a partition may be forced, e.g., by the loss of a link between two groups of nodes. Network/cluster partitioning is described, for example, in U.S. Pat. No. 7,693,120, "NEURAL NETWORK-BASED MOBILITY MANAGEMENT FOR SELF-PARTITION DETECTION AND IDENTIFICATION OF MOBILE AD HOC RADIO NETWORKS" to Hesham El-Damhougy (hereinafter El-Damhougy III), filed coincident herewith, assigned to the assignee of the present invention and incorporated herein by reference.

Since, individual links may be lost at any time; at any point in time, each node may lose contact with linked nodes and/or make direct contact or re-establish direct contact with previously disconnected nodes. In some instances these changes may occur randomly, e.g., from node additions and deletions and from terrain or weather changes. For example, some nodes may move out of range of others, local interference such as terrain or countermeasures may block communications between nodes, and some nodes may even be destroyed. Also, intermediate paths may change as new nodes add themselves to the MCNN or as previously connected nodes reconnect. Whenever a link is lost, any disconnected nodes must find alternate connection paths that may force MCNN partition changes. In the example of FIG. 1A, tank 116 is destroyed, which breaks the links 118, 122 in the indirect connection between tank unit 114 and UAV 100. Consequently, tank unit 114 must reconnect indirectly to UAV 100 through a healing node, UGV 102 or 104 over path 116' or 116". Also, tank unit 114 movement, e.g., into the hills, may break the link 124, forcing the infantry unit to reconnect through another healing node, e.g., UGV 104 over path 124'.

The NMS manages and coordinates these network changes (link losses, node additions and deletions) with the cluster leaders and each cluster leader manages and coordinates changes within its respective cluster. As noted hereinabove, each node continually gathers connectivity data with connected nodes, e.g., signal strength, relative direction of travel and relative speed. The collected data is distributed throughout the MCNN for maintaining connectivity. The NMS and cluster leaders use the collected data in node mobility prediction to track and predict node movement for maintaining connectivity through partition changes that may be caused by predictable/forecastable events. Node mobility prediction is described, for example, in U.S. Pat. No. 7,555,468, "NEURAL NETWORK-BASED NODE MOBILITY AND NETWORK CONNECTIVITY PREDICTIONS FOR MOBILE AD HOC RADIO NETWORK," to Hesham El-Damhougy (hereinafter El-Damhougy IV), filed coincident herewith, assigned to the assignee of the present invention and incorporated herein by reference.

When two nodes lose communication with each other and a direct link between the two is broken, the NMS and/or the responsible cluster leader may take remedial action. In some instances, such a loss partitions the network or a cluster. Typically, the NMS and/or the responsible cluster leader determine(s) an expected time-to-reconnect, find alternate connection paths, find healing nodes to be repositioned, or decide whether to reconfigure the partitions to heal the MCNN. Healing nodes are selected and trained before network deployment, both as described in El-Damhougy I and as described hereinbelow. Network healing may be accomplished by the MCNN itself (self-healing) or with the assistance of an operator.

Figure 2:
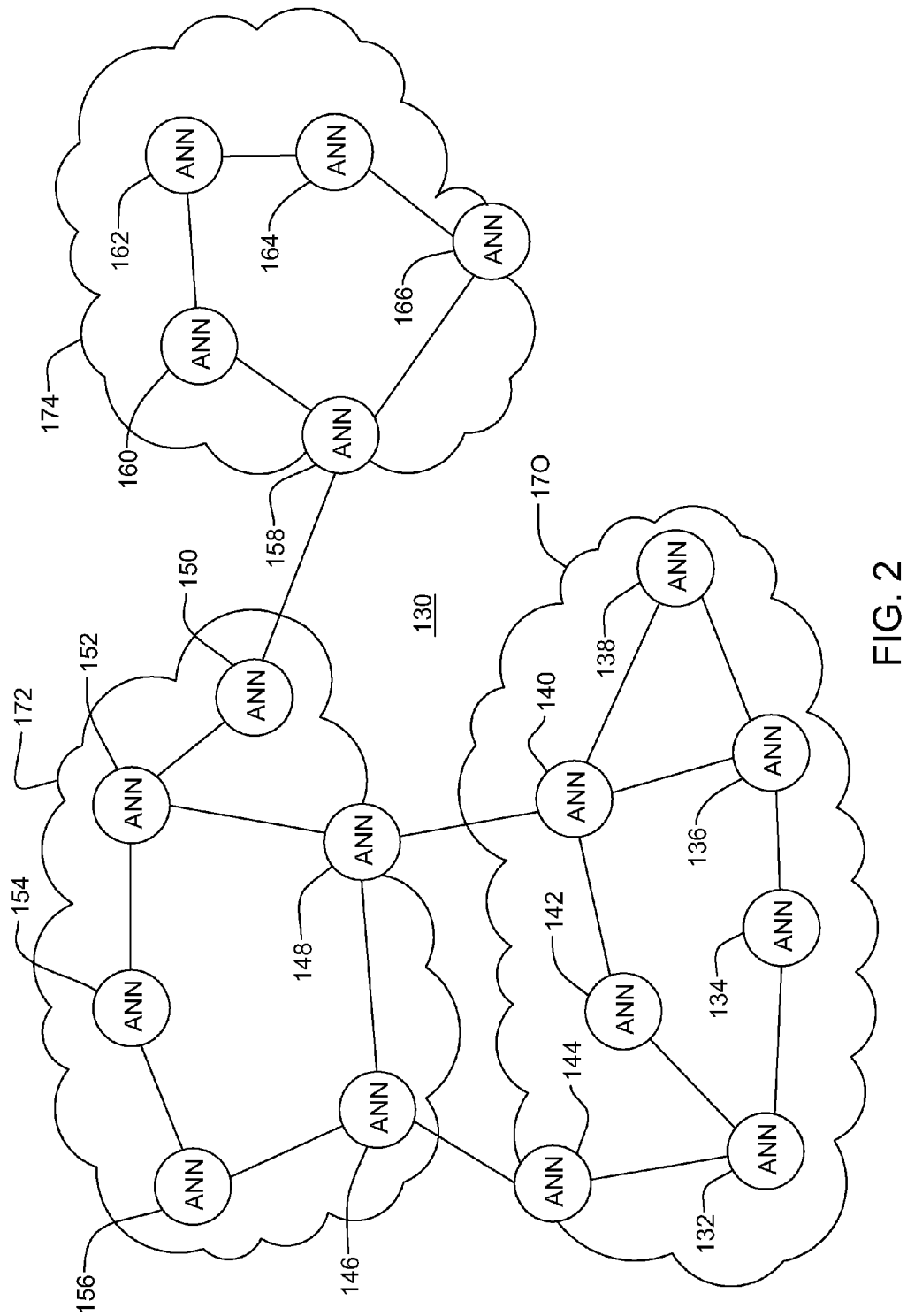
FIG. 2 shows an example of a network graph including eighteen (18) connected nodes grouped in three clusters.

FIG. 2 shows an example of a network graph 130 including eighteen (18) connected nodes 132, 134, 136, 138, 140, 142, 144, 146, 148, 150, 152, 154, 156, 158, 160, 162, 164, 166, grouped in three clusters 170, 172, 174. Preferably, as noted hereinabove, the MCNN includes a number of strategically located nodes, e.g., 142, 144 and, 150 that are healing nodes previously selected and included for self healing. Self healing repositions pre-selected healing nodes to heal the partitioned network, if possible, and without adding external nodes. Preferably, the healing nodes maintain an on-line dynamic link budget for signal modeling, e.g., in a propagation model. When a connection is lost between two groups of nodes, the network may reroute the connection through another link, if possible or, a respective one of the healing nodes 142, 144, 150 may take appropriate action to heal (i.e., reconnect) the network. A respective healing node can, for example, relocate itself to heal the network. On occasion, however, depending upon the terrain and the specific loss, self healing may not be possible. So, self healing may be impossible if, for example, a suitable healing position is inaccessible, e.g., in hostile territory or in the middle of a lake and etc.

Figure 3A:
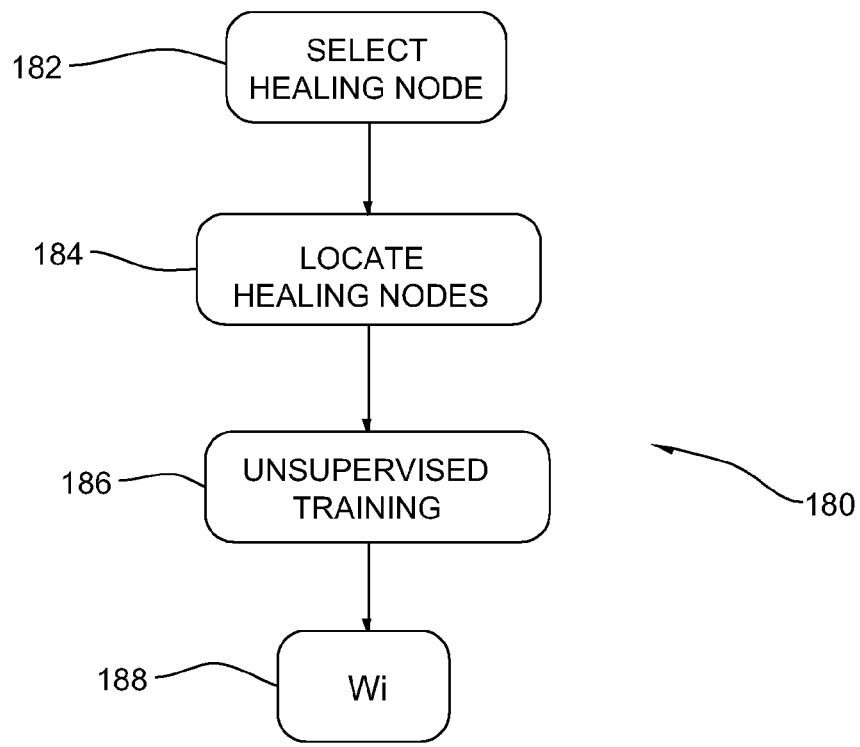
FIGS. 3A-B show an example of a flow diagram for selecting healing nodes.
Figure 3B:
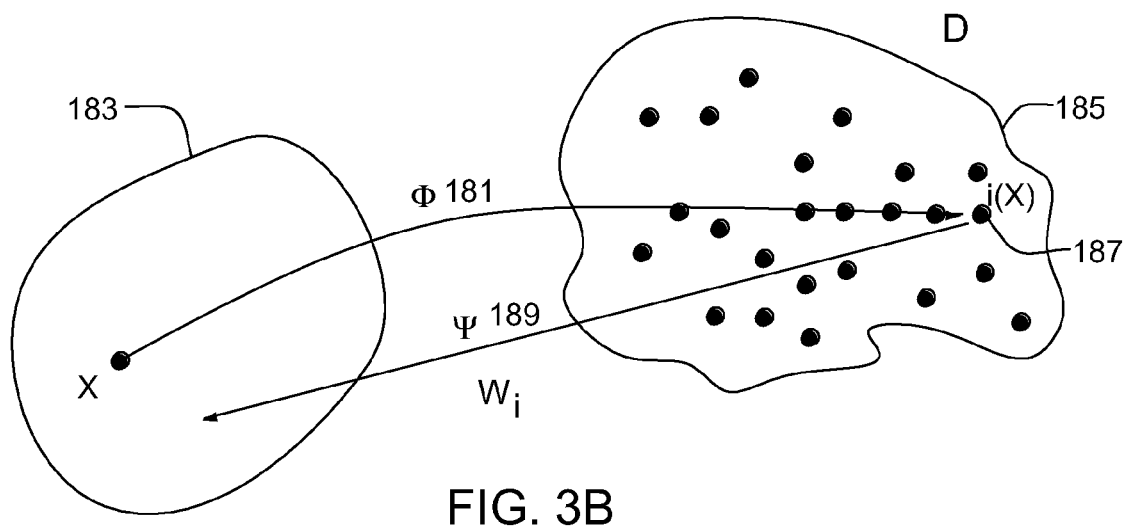

FIGS. 3A-B show an example of pre-selecting network nodes as healing nodes according to a preferred embodiment of the present invention. The selected healing nodes can be moved into position, whenever possible, to heal the network after it has been partitioned, e.g. by loss of a link from destruction or unavailability of a linking node. FIG. 3A shows an example of a flow diagram 180 for this example uses two maps or mapping functions shown in FIG. 3B with reference to the network graph 130 of FIG. 2. One map ($\Phi$) 181 maps each of a finite set of node locations x in discrete space (X 0 $R^3$) 183 to locations in a subset of optimum healing locations in discrete finite space D={$W_1, \ldots, W_k$} 185, where the j$^{th}$ healing vector is identified by a coordinate vector ($W_j$) 187. The other map ($\psi$) 189 maps nodes in the optimum healing locations in D space 185 back to X space 183.

In step 182 potential healing nodes (mobile nodes that can move or change locations) are selected in each partition/cluster together with an associated partition/cluster for reconnecting to, e.g., 140, 144 for reconnecting partition 170 to 172 and 158 for reconnecting partition 172 to 174. In step 184 the selected nodes (140, 144, 158 in this example) are located at initial healing node locations as healing nodes. Then, in step 186 unsupervised training is conducted to recursively construct $\Phi$ 181 and $\psi$ 189 in Euclidean ($R^3$) space for the coverage area. The training result has the form $\Phi:R^3 \rightarrow D \delta R^3$, where, as noted above, D 185 is a (finite) subset of $R^3$ representing the initial locations of the pre-selected healing nodes; and $\psi:D \rightarrow R^3$, to map the initial positions of the healing nodes to their final healing positions. So, during unsupervised training step 186, with healing nodes located at a subset of discrete optimum locations in D space, the network is presented with only the node positions and corresponding predicted healing locations (e.g., from off-line initial network training) and neighboring locations from training. In step 188 new optimum locations are identified for healing nodes, weighted by synaptic weights (Wi) that represents the node position coordinates from results of final unsupervised training. It should be noted that healing nodes may be selected and positioned by a single central node identified for this task (e.g., the cluster leader) or in a decentralized manner by candidate healing nodes neurons.

In particular, a suitable learning rate function ($\eta$, $0 \leq \eta < 1$) and a neighborhood function (h(i, j)) facilitate selecting healing nodes. A preferred learning rate function, for example, may have the form $\eta^k = \eta_0 (\eta_f/\eta_0)^{k/k(max)}$, where $\eta^k$ is the learning rate at the k$^{th}$ iteration, and $\eta_0$ and $\eta_f$ are the initial and final values of $\eta$, e.g., chosen by simulation, e.g., during training. Similarly for the variance, expressed as $\sigma^k = \sigma_0(\sigma_f/\sigma_0)^{k/k(max)}$, where the initial and final values of $\sigma$ are also chosen by simulation and, $\sigma_0$, $\eta_0 \in (0,1)$. The variance $\sigma$ controls the width of the neighborhood of winning neurons and may be set proportional to $1/k^\alpha$, where k is the learning or iteration step and $0 < \alpha \leq 1$. A preferred healing function is monotonically decreasing function with respect to the distance between nodes i and j. Moreover, a preferred suitable healing function is symmetric with respect to indices of local healing neurons, i.e., h(i, j)=h(j, i) with values (as measured by the loss function d(x, y)) close to 1 for units i close to unit j. Specifically, for the k$^{th}$ iteration step, h(i, j) $\rightarrow$ 0 when k $\rightarrow \infty$. A suitable neighborhood functions is provided, for example by M. H. Hassoun "Fundamentals of Artificial Neural Networks" MIT Press, 1995, which teaches the neighborhood function, $h(i, j) = e^{-d(i,j)/2\sigma^2}$, where d(i,j) is the distance between units i, j. Another suitable example is provided by T. Kohonen "Self-Organizing Maps" Springer, 2001; 3$^{rd}$ Edition.

Figure 4A:
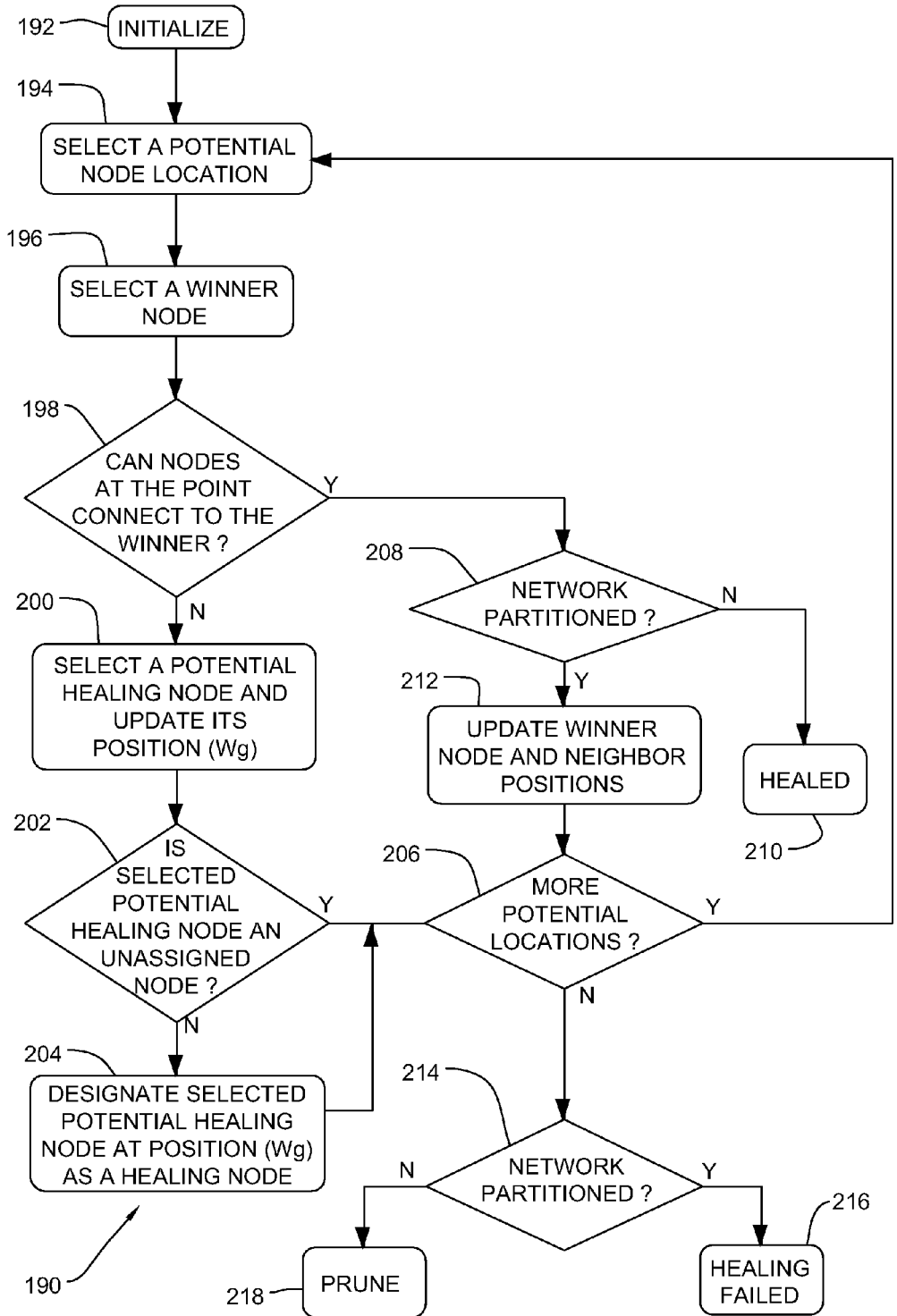

FIGS. 4A-B show a flow diagram example 190 and corresponding pseudo code example of selecting healing nodes for healing the network. First in step 192, the finite set of nodes H $\subset R^3$ is initialized as the empty set, ($\rho$. In step 194, a data vector (x) for a single node is selected from the finite set of nodes X $\subset R^3$. Resolution accuracy will be determined through off-line simulation. In step 196 the node having the least propagation loss to x is selected as a winner node ($W_c$). In particular, the winner node satisfies d(x, $W_c$)=min(d(x, $W_c$)), where d(x, y) describes the propagation loss between nodes at locations x and y. Then, in step 198 the propagation loss from the selected data vector is checked to the winning node to determine whether adding a healing node is necessary. Adding healing nodes may be necessary because the propagation loss from the winner node to x is greater than the maximum acceptable propagation loss, i.e., whether d(x,$W_c$) <$\rho$. If the propagation loss is greater than p, then the network cannot remain connected without healing and, in step 200 a healing node (neuron $W_g$) is selected from the set of potential healing nodes D. Preferably, the node closest to x is selected from D and moved to the position of x or to y:=Centroid {$\zeta/\zeta \in X$}. Then, if in step 202 all of the potential healing nodes have not been assigned from D for healing, in step 204 the potential healing node at position $W_g$ is transferred to the healing node set, assigned for healing and no longer is available for assignment, i.e., if D #$\phi$ then, H $\leftarrow$ H $\cup$ {$W_g$} and D $\leftarrow$ D\{$W_g$}. Continuing from steps 198, 202 or 204 to step 206, the set of available healing positions is checked to determine if any remain. If available healing nodes remain, returning to step 194, another data vector (x) is selected, checked for connection to the network and, if necessary, an attempt is made to heal the network with a node at x. It should be noted that better accuracy may be attained by adding more positions (x) to enlarge X for higher resolution.

If in step 198, however, the node at x is connected, then in step 208 the network is checked to determine if it is still partitioned, e.g., as described in El-Damhougy III. If the network is not partitioned, the network has been healed; and in step 210 healing ends. Otherwise, if the network is partitioned in step 208, then in step 212 the positions of the winner node and its neighbors and connections are updated for the i$^{th}$ node as the winner according to $W_i \leftarrow W_i + \Delta W_i$. Further, $\Delta W_i$ is a function of both learning rate (TI) and, the neighborhood function (h(i, i*)), where i* is the winner node index and has the form $\Delta W_i = \eta h(i, i^*) (x-W_i)$. Again in step 206 the set of available healing positions is checked to determine if any remain; and if available healing nodes remain, returning to step 194, another data vector (x) is selected. Once all available healing nodes are found to have been assigned in step 206, then in step 214 the network is again checked to determine if it is still partitioned. If the network remains partitioned, then in step 216, the network has failed to heal and healing ends. Otherwise, in step 218 the network is pruned by removing healing nodes, one at a time, until the network is partitioned by a node removal.

Frequently, operating conditions and terrain may limit locations that are available for healing nodes. For example, UAVs can be located over any terrain, but at too high an altitude it may be unable to maintain contact with other nodes. During network initialization potential healing node positions may be specified a priori. However, thereafter it may be necessary to constrain healing node movement. For example, a relatively low ceiling may be fixed for UAV healing nodes and, especially during adaptation, flight paths may be restricted. Similarly UGV healing node locations may be restricted to exclude vulnerable areas and inaccessible regions, e.g., enemy locations and bodies of water, such as lakes or the sea. Optionally, additional healing nodes may be required to avoid these inaccessible locations. So, if in step 208 a position selected for a winner node that is in an inaccessible location, then an alternate position is selected that is as close as possible to the winner node location. In selecting an alternate location, $W_i \leftarrow \inf_{z \in A} [d(z_t,(W_t+\Delta W_t))]$. Healing node selection and planning may be done by tessellating the MCNN coverage area initially, substantially similarly to and/or coincident with cluster leader and NMS selection as described in El-Damhougy I.

Figure 5:
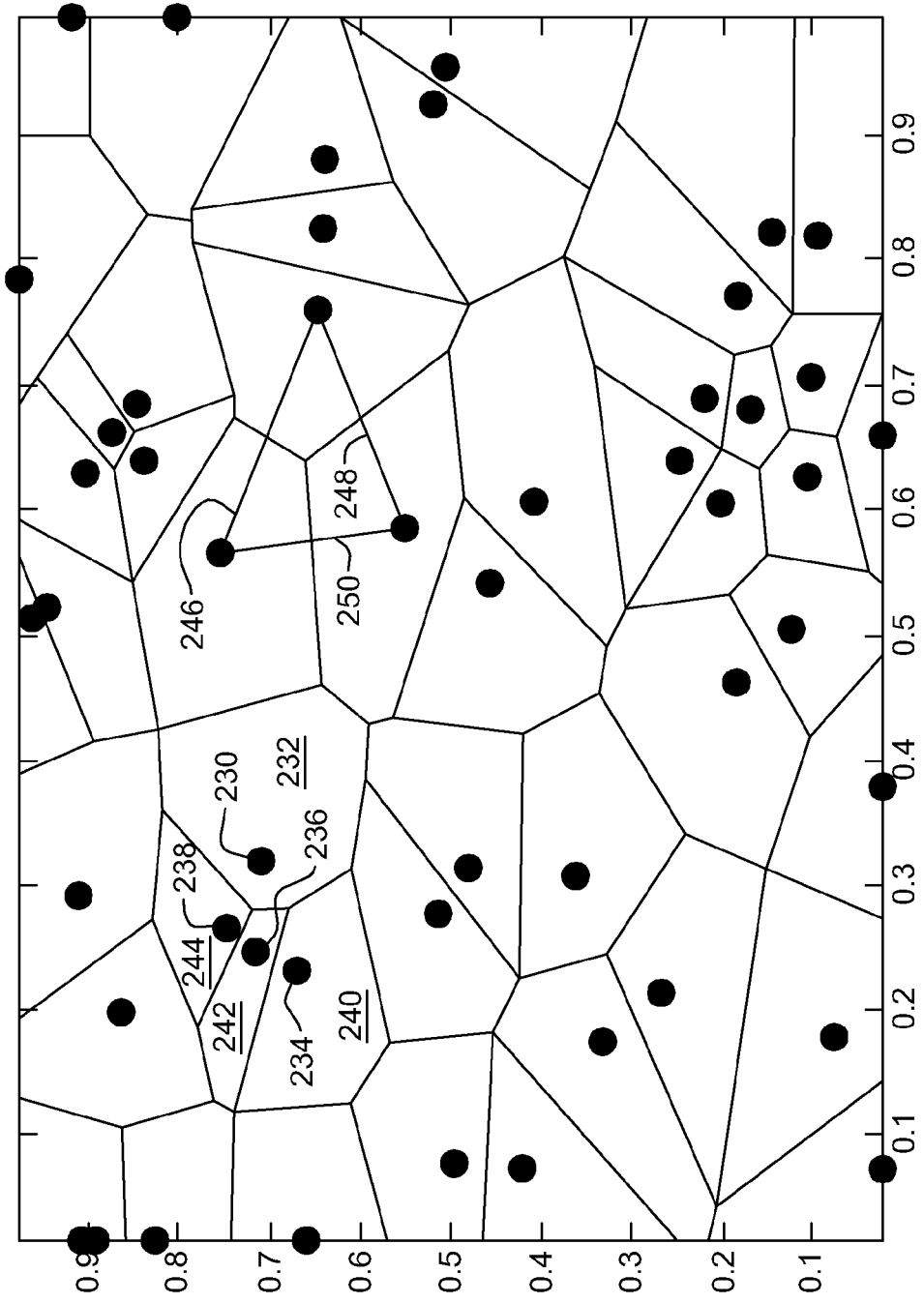
FIG. 5 shows an example of a tessellated MCNN coverage area.

FIG. 5 shows an example of a tessellated MCNN coverage area, that may be the entire theater, or depending on the tactical mission at hand, just a local area within the theater. Preferably, an initial tessellation is done off-line, e.g., during training simulation, using artificial neurons, which may or may not be identical to the neurons in the MCNN and located with healing nodes. Tessellation is conducted substantially similar to network planning and healing and, normally, occurs after partitioning the entire coverage area (e.g., the battle theater), also by an operator or planner. Generally, neither the number/locations of healing nodes required for a geographic mission area or battlefield, the statistical distribution of mobile nodes nor are known and propagation environment has not been modeled in advance. Preferably, as described hereinbelow, general propagation model is used that is general enough to take into account the real-time variations while estimating the required number of healing nodes, which are otherwise not known in advance. The estimation involves an on-line and off-line estimation. The on-line estimation ensures adaptation to changing propagation environment. Propagation losses between nodes or potential positions are done through on-line measurements for on-line adaptation substantially as described in El-Damhougy IV. Adaptation also provides healing node position trajectories or repositioning caused by network node mobility.

The tessellation divides the coverage area into disjoint regions with each node in one region and represented by the node, known in the art as a Voronoi node (e.g., 230) or Voronoi prototype. For each region (e.g., 232) in the tessellated coverage area, points in that region are closer to the respective Voronoi node 230 than to the Voronoi nodes 234, 236, 238, in any other region. So, the MCNN nodes in each region 232, 240, 242, 244 have the strongest radio frequency (RF) connectivity to the respective Voronoi node 230, 234, 236, 238. What is known in the art as a Delaunay graph may be generated from the Voronoi graph by connecting Voronoi nodes that share the same boundary edge and so, have an RF connection by the edge, e.g., 246, 248, 250.

So, the Voronoi nodes may be selected as points that are separated by a distance that is closer than a maximum allowable separation to maintain direct communication, i.e., at maximum acceptable propagation loss. So, for example, the Delaunay edges identify linked nodes. Once the coverage area is tessellated and Delaunay edges are generated, healing node locations may be selected, e.g., based on a selected maximum allowable cluster separation. Graph theoretic and combinatorial optimization algorithms may be used to perform optimal healing and network routing. The remaining Voronoi nodes are allowed to "die" or are put to sleep until recalled, later for memory healing. Also, the tessellation may be hierarchical with Voronoi (and healing) nodes identified at each level, e.g., as represented in FIG. 1C. Lower level nodes may communicate directly with healing Voronoi nodes at any level. Preferably, the coverage area for each healing Voronoi node extends over the entire coverage area for the next sub-level, e.g., for the example of FIG. 1C, the UAV 100 covers the entire theater, and each UGV 102, 104, 106 (and any other healing node) covers the entire area of connected lower level clusters.

Figure 6:
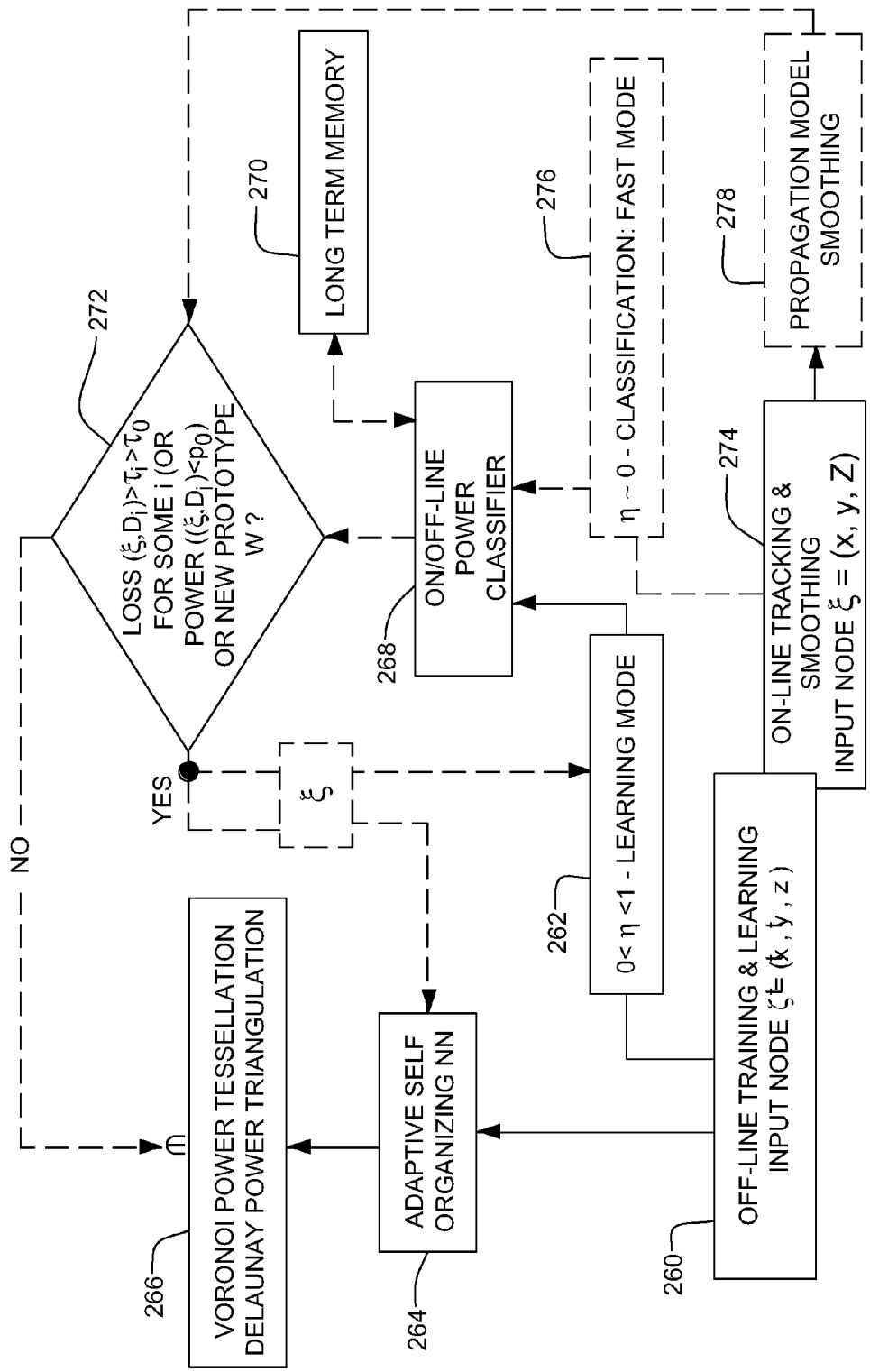
FIG. 6 shows an example of topology extraction for considering topological effects on propagation loss in three dimensions in healing the network.

FIG. 6 shows an example of topology extraction for considering topological effects on propagation loss in three dimensions in healing the network according to a preferred embodiment of the present invention. Preferably, this topology extraction is conducted both off and on-line. Off-line training begins 260 by a selecting point ($\zeta$) with a given location (x, y, z) at a given t. The learning rate function ($\eta$, $0 \leq \eta < 1$) is applied 262 to the selected point. Coincidentally, the point is passed to the ASONN 264 to identify a winner node ($W_g$) position, e.g., as described for FIG. 3. The ASONN 264 avoids vulnerable and inaccessible regions such as enemy locations and water, and ensures network connectivity, as described in more detail hereinbelow.

Voronoi Power Tesselation and Delaunay Power Triangulation are applied 266 to the results of the healing training for the selected point. Also, in parallel, the learning rate function application results are passed to a power classifier 268 for off-line power classification, also described in more detail hereinbelow. The off-line power classification results are stored in long term memory 270; and, coincidentally, the Voronoi nodes ($D_i$) are iteratively checked 272 to determine if any are within healing range of the winner node location ($\xi$). The winner node is within healing range when propagation loss ($\tau$) from that location to at least one Voronoi node is less than a selected (by simulation) design point. The design point is a target propagation loss ($\tau_1$) that is selected larger than the minimum loss to connect ($\tau_0$), and that corresponds to the distance where signal power falls below minimum power ($p_0$) to connect. Testing for the target propagation loss ($\tau_1$) instead of for $\tau_0$ avoids overtraining the system, which may result in over fragmenting/tesselating the coverage area. As long as a Voronoi node (i.e., to identify a healing region) is not found within healing range, the tesselated/triangulated coverage area is further tesselated 266 for the selected point. However, once a Voronoi node is within healing range 272, then, the point is added to the healing node set for the coverage area and positions of other healing nodes are adjusted.

On-line healing is substantially faster, since the set of healing nodes has been previously identified, e.g., during training or from preceding operations. Nodes track each other and maintain an up-to-date terrain description 274 and, when a node is separated from the network or cluster, a fast mode learning rate function 276 is applied based on the location ($\xi$) of the disconnected node. Also, in parallel, a suitable signal propagation and smoothing model (e.g., stochastic approximation or adjusted for terrain based propagation variations) 278 is applied to improve the accuracy of signal propagation comparisons. The learning rate function results are passed to the power classifier for on-line power classification 268, which is substantially similar to off-line classification, except that instead of finding a winner node for (somewhat) arbitrary points/locations, a winner node is identified either from among the healing nodes, or by adding a new healing node. This is followed by adaptation, by moving some healing nodes to reposition them for the disconnected node. The on-line power classification results are stored in long term memory 270. The results of both the on-line power classification and signal propagation and smoothing are combined and the Voronoi nodes ($D_i$) are iteratively checked 272 to determine if any are within healing range of the winner node location.

Figure 7A:
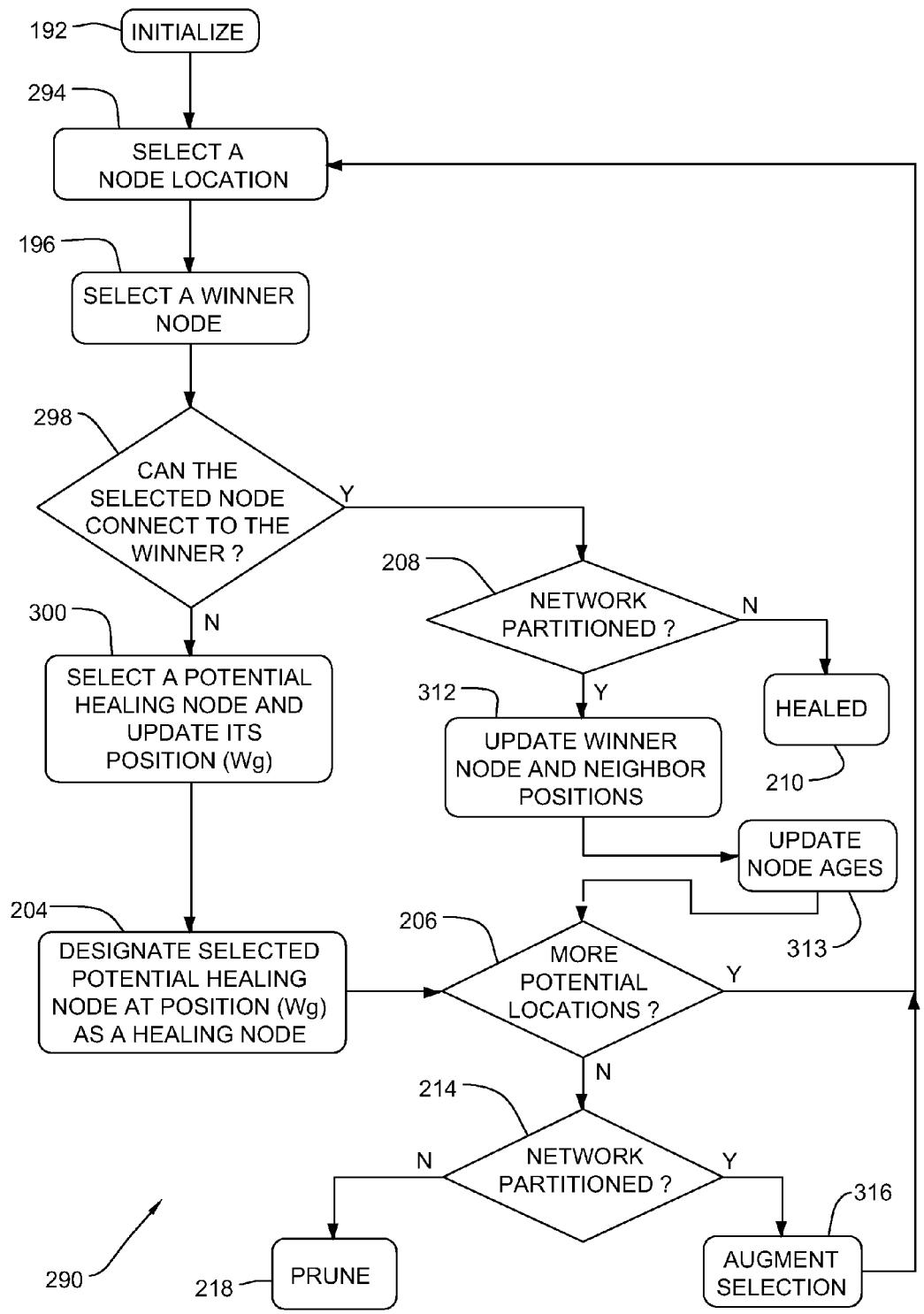

FIGS. 7A-B show a flow diagram example 280 and corresponding pseudo code example of adaptive self organizing 264 and power classification 268 in healing a network as shown in FIG. 6. This example 290 is conducted substantially similar to the example of pre-selecting and training healing nodes of FIGS. 4A-B with like steps labeled identically. Again, in step 192, the finite set of nodes $H \subset R^3$ is initialized as the empty set, $\phi$. However, instead, in step 294 a single node position in the coverage area (i.e., the battlefield theater) is selected as the data vector (x). In step 196 the node having the least propagation loss to x is selected as a winner node ($W_c$). Again, the winner node satisfies $d(x, W_c)=\min(d(x, W_c))$, where $d(x, y)$ describes the propagation loss between nodes at locations x and y. In step 298 if the winning node propagation loss to node x exceeds the minimum acceptable propagation loss, then, in step 300 a healing node (neuron $W_g$) is created at x or y:=Centroid $\{\zeta/\zeta \in X\}$ and, in step 204, the potential healing node at position $W_g$ is placed in the healing node set, i.e., $H \leftarrow H \chi \{W_g\}$. Continuing from steps 198 or 202 to step 206, the set of available healing positions is checked to determine if any remain. If available healing nodes remain, returning to step 194, another data vector (x) is selected, checked for connection to the network and, if necessary, an attempt is made to heal the network with a node at x. Again, better accuracy may be attained by considering more node positions (x) to enlarge X for higher resolution.

Once again, if in step 198, however, the node at x is connected, then in step 208 the network is checked to determine if it is still partitioned, e.g., as described in El-Damhougy III. If the network is not partitioned, the network has been healed; and in step 210 healing ends. Otherwise, if the network is partitioned in step 208, then, in addition to updating the positions of the winner node and its neighbors and connections in step 312, the ages of nodes are updated in step 313 for Voronoi power tessellation and Delaney power triangulation. In step 206 the set of available healing positions is checked to determine if any remain; and if available healing nodes remain, returning to step 294, another data node location (x) is selected. Once all available healing nodes are found to have been assigned in step 206, then in step 214 the network is again checked to determine if it is still partitioned. If the network is unpartitioned, in step 218 the network is pruned by removing healing nodes, one at a time, until the network is partitioned by a node removal. Otherwise, if in step 316 the network is found to be partitioned and no nodes remain, then the set of nodes X may be fine grained and augmented or enlarged with other potential network node positions, e.g., by adding new nodes or by selecting healing nodes, before returning to step 294 for additional healing. The same constraints may be placed on healing nodes in the battlefield as in training, i.e., limiting UAV ceiling or UGV location.

Advantageously, a preferred ad hoc communications network is self-healing and adapts well to network changes in real time, and in particular to node losses and disconnects. After initially identifying hierarchically organized network leaders and healing nodes, healing nodes step in to repair lost connections/nodes as the situation requires. Thus, the network maintains communication in spite of losing nodes that are actively engaged in keeping the network connected, e.g., cluster leaders.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

I claim:
1. A method of managing an ad hoc communications network, said method comprising the steps of:
   a) locating a plurality of nodes within a coverage area;
   b) selecting at least one of said plurality of nodes within at least one group said plurality of nodes as a healing node, each of said healing node being relocatable within a corresponding said group;
   c) locating each said healing node at a location;
   d) training said healing nodes to selectively reconnect to at least one other said group whenever a connection to other said nodes of at least one other said group is lost; wherein the training is unsupervised and recursively constructs a map of healing nodes ($\Phi$) and $\psi$ in Euclidean ($R^3$) space for the coverage area and has the form $\Phi:R^3 \rightarrow D \subset R^3$ and $\psi:D \rightarrow R^3$; and
   e) relocating each said healing node at said location.

2. A method as in claim 1, wherein each said group is a cluster of said nodes and at least one said healing node is identified for each said cluster.

3. A method as in claim 1, wherein said ad hoc communications network is partitioned, each said group is a partition of said ad hoc communications network and at least one said healing node is identified for each said partition.

4. A method as in claim 1, wherein the step (c) of locating said healing nodes places each identified said healing node at said location selected from a set of identified said healing node said locations.

5. A method as in claim 4, wherein the identified said set is a subset of said node locations.

6. A method as in claim 1, after the step (e) of relocating said healing nodes further comprises the steps of:
   f) monitoring connection within each said group to at least one other said group; and upon loss of connection;
   g) identifying a healing node to reconnect a disconnected group, the identified said healing node being selected from a set of previously identified said healing nodes; and
   h) relocating the identified said healing node to reconnect said disconnected group.

7. A method as in claim 6, wherein the step (g) of identifying said healing node comprises the steps of:
   i) selecting a said node from said nodes in said disconnected group;
   ii) identifying a winner said node from said set of previously identified said healing nodes, said winner node being the node from said set closest to the selected said node;
   iii) determining whether the selected said node is within a selected maximum distance from said winner node; and
   iv) determining whether said disconnected group is reconnected.

8. A method as in claim 7, wherein whenever in step (iii) the winner node is beyond said selected maximum distance, said method further comprises creating a new said node and designating the new said node as said healing node.

9. A method as in claim 7, wherein whenever in step (iv) said disconnected group is reconnected, said method further comprises the steps of:
   v) checking said network to determine whether it is partitioned, and whenever said network is partitioned;
   vi) updating the position and an age of said winner node and neighbors of said winner node;
   vii) determining whether other said nodes of the set of said nodes remain; and whenever other said nodes remain; and viii) returning to step (i) and selecting a remaining one of said set of said nodes.

10. A method as in claim 9, wherein whenever in step (vii) all of the set of said nodes have been selected, said method further comprises the steps of:
   vi-1) determining whether said network is connected; and
   vi-2) pruning said healing nodes from a group of designated said healing nodes.

11. A method as in claim 10, wherein whenever in step (vi-1) said network is partitioned, said method further comprises indicating that healing has failed.

12. A method of training healing nodes in an ad hoc communications network, said method comprising the steps of:
   a) selecting a node location from a plurality of node locations in an ad hoc communications network;
   b) identifying a winner node as being closest of the remaining ones of said plurality of node locations;
   c) determining whether a node at the selected said node location is within a selected maximum distance from said winner node; and
   d) determining whether said ad hoc communications network is connected; and wherein the training is unsupervised and recursively constructs a map of healing nodes ($\Phi$) and $\psi$ in Euclidean ($R^3$) space for the coverage area and has the form $(\Phi):R^3 \rightarrow D \subset R^3$ and $\psi:D \rightarrow R^3$.

13. A method as in claim 12, wherein whenever in step (c) the winner node is beyond said selected maximum distance, said method further comprises the steps of:
   c1) selecting a potential healing node;
   c2) determining whether selected said potential healing node is previously assigned as a healing node; and
   c3) designating selected said potential healing node as said healing node.

14. A method as in claim 12, wherein whenever in step (d) said ad hoc communications network is partitioned, said method further comprises the steps of:
   e) updating the position of said winner node;
   f) determining whether other ones of said plurality of node locations remain for selection as healing nodes; and
   g) returning to step (a) and selecting another remaining one of said plurality of node locations.

15. A method as in claim 14, wherein whenever in step (f) all of said plurality of node locations have been selected, said method further comprises the steps of:
   f1) determining whether said ad hoc communications network is connected; and
   f2) pruning healing nodes from a group of designated said healing nodes.

16. A method as in claim 15, wherein whenever in step (f1) said ad hoc communications network is partitioned, said method further comprises indicating that healing has failed.

17. A method of managing nodes in an ad hoc communications network, said method comprising the steps of:
   a) training communications nodes off-line for a selected coverage area, said ad hoc communications network including a plurality of mobile nodes initially located at selected locations in said coverage area and grouped into a plurality of groups, at least one of said plurality of nodes being selected as healing nodes within each group of said plurality of nodes, each of said healing nodes being relocatable within a corresponding said group;
   b) deploying the trained said nodes in an ad hoc communications network;
   c) monitoring, within each said group, connection to at least one other said group; and upon loss of connection,
   d) relocating a corresponding said healing node to reconnect each said group to the at least one other said group, wherein the healing node is trained unsupervised to reconnect by recursively constructing a map of healing nodes ($\Phi$) and $\psi$ in Euclidean ($R^3$) space for the coverage area and has the form $\Phi:R^3 \rightarrow D \subset R^3$ and $\psi:D \rightarrow R^3$.

18. A method as in claim 17, wherein unsupervised training said healing node comprises the steps of:
   i) selecting at least one said node from said trained nodes in the disconnected said group;
   ii) identifying a winner node from said trained nodes, said winner node being the trained said node closest to the selected said node;
   iii) determining whether the selected said node is within a selected maximum distance from said winner node; and
   iv) determining whether the disconnected said group is reconnected.

19. A method as in claim 18, wherein whenever in step (iii) the winner node is beyond said selected maximum distance, said method further comprises creating a new node and designating the created said new node as said healing node.

20. A method as in claim 18, wherein whenever in step (iv) said disconnected group is reconnected, said network is checked to determine whether it is partitioned, and whenever said network is partitioned, said method further comprises the steps of:
   v) updating the position and the age of said winner node and neighbors of said winner node;
   vi) determining whether any of said trained nodes remain; and whenever said trained nodes remain,
   vii) returning to step (i) and selecting at least one said node from the remaining said trained nodes.

21. A method as in claim 20, wherein whenever in step (vi) all of said trained nodes have been selected, said method further comprises the steps of:
   vi-1) determining whether said network is connected; and
   vi-2) pruning healing nodes from a group of designated said healing nodes.

22. A method as in claim 21, wherein whenever in step (vi-1) said network is partitioned, said method further comprises indicating that healing has failed.

23. A node trainable as a healing node for use in an ad hoc communications network comprising:
   off line training means for receiving off-line training for a selected coverage area in an ad hoc communications network of a plurality of mobile nodes grouped into a plurality of groups;
   transportation means for locating said healing node to a preselected location, responsive to said training;
   means for monitoring connection of a group of ad hoc communications network nodes to at least one other group; and
   means for determining a location to reconnect said group to said at least other group, responsive to said training, said transportation means further being for relocating said healing node to the reconnect said location, wherein the means for determining unsupervised and recursively constructs a map of healing nodes ($\Phi$) and $\psi$ in Euclidean ($R^3$) space for the coverage area and has the form $\Phi:R^3 \rightarrow D \subset R^3$ and $\psi:D \rightarrow R^3$.

24. A node as in claim 23, wherein said node is coupled to an unmanned ground vehicle.

25. A node as in claim 23, wherein said node is coupled to an unmanned air vehicle.

* * * * *